United States Patent
Funnell et al.

(10) Patent No.: US 8,554,266 B2
(45) Date of Patent: *Oct. 8, 2013

(54) CELL SELECTION IN MOBILE COMMUNICATIONS

(75) Inventors: Nicola M. Funnell, Cumbria (GB); Gideon Roberts, Stone (GB); Andrew John Farnsworth, Bromsgrove (GB); Richard John George, Waterloo (CA); Gjalt de Jong, Leuven (BE)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,039

(22) Filed: Feb. 15, 2011

(65) Prior Publication Data

US 2011/0136489 A1    Jun. 9, 2011

Related U.S. Application Data

(63) Continuation of application No. 12/773,244, filed on May 4, 2010, now Pat. No. 7,912,494, which is a continuation of application No. 10/840,191, filed on May 6, 2004, now Pat. No. 7,747,275.

(51) Int. Cl.
*H04B 7/00* (2006.01)
*H04W 4/00* (2009.01)
*H04W 36/00* (2009.01)

(52) U.S. Cl.
USPC ........... 455/525; 455/434; 455/444; 455/436; 455/437; 455/438; 370/331; 370/332; 370/335

(58) Field of Classification Search
USPC .......... 455/434, 444, 436, 437, 438; 370/331, 370/332, 335
See application file for complete search history.

(56) References Cited

U.S. PATENT DOCUMENTS

| | | | | |
|---|---|---|---|---|
| 5,722,072 | A | * | 2/1998 | Crichton et al. ............... 455/437 |
| 6,163,694 | A | * | 12/2000 | Lind et al. ................... 455/435.3 |
| 6,163,699 | A | * | 12/2000 | Naor et al. ..................... 455/453 |
| 6,167,283 | A | | 12/2000 | Korpela et al. |
| 6,507,740 | B2 | * | 1/2003 | Shi ................................ 455/437 |
| 6,751,472 | B1 | * | 6/2004 | Muhonen ................... 455/553.1 |

(Continued)

FOREIGN PATENT DOCUMENTS

WO    00/54522 A2    9/2000

OTHER PUBLICATIONS

3GPP, Procedures in Idle Mode and Procedures for Cell Reselection in Connected Mode (Release 4), Jun. 2002, http://www.arib.or.jp/IMT-2000/V310Sep02/T63/Rel4/25/A25304-450.pdf.

*Primary Examiner* — Bobbak Safaipour

(57) ABSTRACT

Mobile user equipment for use in a cellular communications environment performs an improved cell selection on transitions out of a connected mode state. The transitions might be from one connected mode state to another or from a connected mode state to idle mode. The improvement in cell selection lies in assembling the list of candidate cells prior to cell selection. In the prior art, the list of candidate cells would usually be restricted to the serving cell or active cells supporting communication between the equipment and the network prior to transition. In embodiments of the invention, the list might comprise cells which are not the serving cell or which are outside the active set, for example a network-preferred cell or cells neighboring the serving cell or cells of the active set.

25 Claims, 3 Drawing Sheets

(56) References Cited

U.S. PATENT DOCUMENTS

| | | | |
|---|---|---|---|
| 6,917,807 B1* | 7/2005 | Vialen et al. | 455/435.2 |
| 6,975,869 B1* | 12/2005 | Billon | 455/452.1 |
| 7,006,828 B1* | 2/2006 | Czaja et al. | 455/442 |
| 2001/0031638 A1* | 10/2001 | Korpela et al. | 455/449 |
| 2001/0046879 A1 | 11/2001 | Schramm et al. | |
| 2002/0197992 A1* | 12/2002 | Nizri et al. | 455/435 |
| 2003/0211847 A1* | 11/2003 | Jang et al. | 455/434 |
| 2004/0192313 A1* | 9/2004 | Otting | 455/446 |
| 2004/0213280 A1* | 10/2004 | Patel | 370/441 |
| 2005/0037778 A1* | 2/2005 | Patel | 455/456.3 |
| 2005/0037798 A1 | 2/2005 | Yamashita et al. | |
| 2005/0148349 A1 | 7/2005 | Putcha et al. | |

* cited by examiner

CELL SELECTION IN MOBILE COMMUNICATIONS

CROSS-REFERENCE TO RELATED APPLICATION

The present application is a continuation of co-pending U.S. patent application Ser. No. 12/773,244 filed on May 4, 2010, which is a continuation of U.S. patent application Ser. No. 10/840,191 filed on May 6, 2004, now U.S. Pat. No. 7,747,275, the contents of which are incorporated herein by reference.

The present invention relates to cell selection in mobile communications. It finds particular application in user equipment state transitions, either between cell states or from a cell state to idle.

Cellular communications provides an access technology for portable user equipment ("UE") to gain access to networks without having to use a wired connection. The key is that a geographical area is divided into cells and each cell has its own wireless access point to one or more networks. Portable user equipment ("UE"), nowadays including such devices as mobile telephones, personal digital assistants and laptop computers, supports wireless communication as far as the access point. The one or more networks then available via the access point may be either wireless or fixed line. The mobile UE can thus use an access point from anywhere in a cell (subject to signal strength) to communicate with either other mobile, or with fixed line, equipment. Nowadays, a UE can also roam, moving from cell to cell while maintaining a connection, this being enabled by standardised handover protocols.

The most successful second generation ("2G") cellular network was the "Global System for Mobile communication" (GSM). The international community is now working towards third generation ("3G") standardisation, based on a set of requirements drawn up by the International Telecommunications Union ("ITU") known collectively as IMT-2000. IMT stands for International Mobile Telecommunications. 3G networks will give users increased data rates, for example up to 2 Mbps. With such speeds, a lot of services including video, fax and internet access can easily be supported. However, 3G networks are not yet generally available and interim network solutions have become known as "2.5G" services. These include GPRS ("General Packet Radio Service"), which shares the wireless access technology dynamically between speech and data and has a theoretical maximum speed of 172.2 kbps, and EDGE ("Enhanced Data Rates for GSM Evolution") which builds on GPRS to give peak rates over 384 kbps.

Many mobile devices already conform to 3G standards even though 3G networks are not yet generally in place. An area in which considerable work has been done is in development of the 3G UMTS ("Universal Mobile Telecommunication System") which is based on GSM technology and incorporates GPRS. The cellular access technology in this case relies on W-CDMA ("Wideband Code Division Multiple Access"). One of the groups working on UMTS standards is the 3$^{rd}$ Generation Partnership Project ("3GPP").

The UMTS network architecture usually has two primary parts, the UTRAN ("UMTS Terrestrial Radio Access Network") and the core network. The UTRAN looks after the physical aspects of providing wireless access for a mobile UE to the core network and the core network provides switching. The UTRAN and the core network communicate with each other via an interface known as the "Iu".

The UTRAN is made up of a set of RNSs ("Radio Network Subsystems"). Each RNS comprises one RNC ("Radio Network Controller") and one or more logical nodes known as "Node Bs". The RNC provides functionality similar to the base station controller in GSM networks and each Node B is the access point of a cell, equivalent to the base station in GSM networks. The RNS, and in particular the RNC, provides the following functions:
radio resource control ("RRC")
admission control
congestion control
power control
handover control The core network has three primary domains, these being a circuit-switched domain, a packet-switched domain and the register and service domain. It provides three main functions:
connection management, comprising the provision of bearer and other services for circuit-switched connections
session management, comprising the set-up, release and monitoring of packet-switched connections
mobility management, comprising the monitoring of UE location and maintenance for example of the HLR ("Home Location Register")

In a cellular communication environment, several different UMTS networks may be available at the same geographical location. In UMTS terminology, these are known as PLMNs ("Public Land Mobile Networks"). In use, a UE is usually configured to make connection to a preferred PLMN at any one location.

A UE in a cell of a PLMN can be in one of at least three different overall states: detached; idle; and connected.

In the detached state, the UE is switched off and there is no communication with it and no need for the network to track its location.

When the UE is switched on, it goes to idle mode. A PLMN is selected and the UE searches for a suitable cell to "camp on". In practice, the UE can camp on a UTRAN, GSM or GPRS cell. In the context of embodiments of the present invention however, GSM or GPRS cells are only of limited interest.

Camping on a cell means that the UE has chosen that cell to provide available services. This cell is known as the serving cell. It has completed a cell selection or reselection process and it tunes to the broadcast control channel ("BCCH") of the serving cell to receive broadcast system information. System information is broadcast in blocks of predefined types. Once the UE is camped on a cell, it can receive system information blocks ("SIBs") from the PLMN, including registration area information. It attempts to register using the non access stratum ("NAS": protocols between a UE and the core network that are not terminated in the UTRAN). If successful, the UE can also receive paging and notification messages from the PLMN and initiate call setup for outgoing calls or other actions from the UE. This is known as being camped normally. If unsuccessful, the UE goes to the "any cell selection" state and thence to "camped on any cell" state. These states in idle mode might arise for example if no suitable cell can be found in the selected PLMN or there is no UICC inserted in the UE. Once camped on any cell, the UE may still be able to obtain limited service such as emergency calls only.

From idle mode, to change to connected mode, the UE sends a connection request to the radio resource control function of the UTRAN. This is called a "RRC CONNECTION REQUEST" message. The UE then looks for a forward access channel ("FACH") which will be used by the UTRAN to send a "RRC CONNECTION SETUP" message. There are four RRC connected states available to the UE, as follows:

CELL_DCH State:

A dedicated physical channel is allocated to the UE in uplink and downlink. The UE is known on cell level according to its current active set (further discussed below). Dedicated transport channels and downlink and uplink shared transport channels become available and a combination of these transport channels can be used by the UE.

CELL_FACH State:

No dedicated physical channel is allocated to the UE. The UE camps on a serving cell and continuously monitors a FACH in the downlink. The UE is assigned a default common or shared transport channel in the uplink, for example a random access channel ("RACH"), that it can use at any time according to the access procedure for that transport channel. The position of the UE is known by the UTRAN on cell level according to the cell where the UE last made a cell update.

CELL_PCH State:

No dedicated physical channel is allocated to the UE. The UE camps on a serving cell and selects and monitors a paging channel, using an associated paging indication channel ("PICH"). No uplink activity is possible. The position of the UE is known by the UTRAN on cell level according to the cell where the UE last made a cell update in CELL_FACH state.

URA_PCH State:

No dedicated physical channel is allocated to the UE. The UE camps on a serving cell and selects and monitors a paging channel, using an associated PICH. No uplink activity is possible. The location of the UE is known on UTRAN Registration Area ("URA") level according to the URA assigned to the UE during the last URA update in CELL_FACH state.

A UE in CELL_DCH state may have, instead of a single cell, an active set of cells involved in a connection. This arises as follows. In practice, the radio transmission/reception to and from a connected UE is controlled via a Node B. However, a UE in a connected state can be connected via several cells and their "Node B"s. These are called the active set. A RNC combines the data streams from the different cells of the active set. To maintain connectivity, the UE measures the received signal levels from the cells of its active set and reports the measurements to the RNC. If there is a need for change, for example because the UE has moved, the RNC instructs the UE to change its active set.

A UE which is camped on a cell, for example in Cell_FACH, Cell_PCH, and URA_PCH connected states or in idle mode, has no active set. It has instead a serving cell from which it can obtain information.

Technical specifications published on the Internet by 3GPP which are relevant to embodiments of the present invention include:

1) TS 25.304 (for example v3.13.0)
"User Equipment (UE) procedures in idle mode and procedures for cell reselection in connected mode"; and
2) TS 25.331 (for example v3.17.0)
"Radio Resource Control (RRC); protocol specification"

A UE moves between idle and connected modes and between different connected mode states. The 3GPP technical specifications mentioned above deal with cell selection in this type of circumstance as follows:

In TS 25.304 it is specified in Section 5.2.7 that when returning to idle mode from connected mode, the UE must select and camp on a suitable cell. Section 5.2.7.1 of TS 25.304 describes cell selection when leaving connected mode to move to idle mode as "Candidate cells for this selection are the cell(s) used immediately before leaving connected mode." That is, the existing serving cell or active set. It is not specified what to do in the case of exiting one connected state such as Cell_DCH and moving to another connected state, such as Cell_FACH, Cell_PCH, or URA_PCH.

Section 5.4.4 of TS 25.304 states that the UE will only perform cell selection in connected mode in the case of Out of Service area and the cell selection process then used is the same as that used for idle mode. This is described in TS 25.304 Sections 5.2.3 and 5.2.7 (though 5.4.4 specifically refers to 5.2.3). Relevant radio bearer control procedures are set out in TS 25.331 v3.17.0, Sections 8.2.2.2 (in particular NOTE 3 in that section), 8.2.2.3, and 8.5.2. Selecting a cell is however also required when changing frequency when in Cell_FACH, as specified in 8.2.2.3.

The following types of transition are of particular interest:
a) Cell_DCH to Cell_FACH, Cell_PCH, or URA_PCH;
b) Cell_FACH to Cell_FACH, Cell_PCH, or URA_PCH; and
c) Cell_FACH or Cell_DCH to Idle Clearly from TS 25.331, cell selection is also required in the case a) where the UE moves out of Cell_DCH and remains in connected mode. That case is not covered by TS 25.304, despite TS 25.331 referencing that document for that functionality. Another factor is raised in relation to case a) by Section 8.2.2.3 of TS 25.331. Here it is stated that if the cell that the UE selects is not the cell indicated by the UTRAN in the message that caused the UE to leave Cell_DCH, then the UE should perform a Cell Update procedure. Hence if the cell indicated by the UTRAN is not in the active set for the UE prior to leaving Cell_DCH, in which case it cannot be selected, the UE will have to perform a cell update immediately after selecting one of the cells from the active set. The UE may then perform cell reselection to the UTRAN specified cell if (a) it is the best cell, and (b) it is in the list of neighbouring cells for the selected cell.

Case b) only requires cell selection if a frequency is specified, as detailed in 25.331 section 8.2.2.3.

Selecting a cell for case (c) is covered in section 5.2.7 of TS 25.304. However, the Cell_FACH transition to Idle case only requires cell selection if a different frequency can be specified, which has been proposed as a change request to TS 25.331.

So in the prior art, upon transition between connected states or from a connected state to idle mode, the only applicable cell selection procedures select a cell from an existing active set for a UE or use the existing serving cell. However, this can result in inefficient use of resources. The serving cell may not be the best available cell and the active set may not include the best available cell from which to select. The serving cell or active set was selected on the basis of the capacity needs of the UE in one particular connected state. Once the UE moves from that state, the serving cell or active set may no longer be the most appropriate. Efficiency of the radio link and power consumption may no longer be optimised in a different state since the communication needs of the UE will have changed.

Further, the serving cell may not be, and the active set may not have included, a cell indicated by the UTRAN at the time of leaving a connected state. The UTRAN may have indicated a cell based on more recent data, such as congestion data, than the data available at the time of selecting the existing serving cell or active set.

According to a first aspect of embodiments of the present invention, there is provided cell selection apparatus for use in mobile communications equipment to select a cell from a candidate set of cells to support subsequent communication between a cellular network and the equipment, said apparatus being triggerable, by a transition of the equipment out of an existing connected mode state in which communication is supported by a serving cell or an active set of one or more cells, to select said cell, wherein the apparatus is adapted to use as said candidate set a set of cells comprising at least one cell which is not a cell supporting the existing connected mode state, where said at least one cell meets at least one predetermined criterion.

Said transition of the equipment might be either to a new connected mode state or to idle mode.

It will be understood that it is not necessary for the transition already to have occurred to trigger said apparatus. A triggering event may for example be receipt of a message or signal by the mobile communications equipment or the cell selection apparatus that a transition is to take place.

Embodiments of the invention are relevant where the cellular network comprises a UMTS network and the candidate set of cells comprises UTRAN cells. However, there may be circumstances, such as radio link failure in Cell_DCH where the UE cannot find any UMTS cells, where the candidate set of cells may be enhanced by the addition of one or more GSM cells.

The mobile communications equipment may comprise a UE as referred to in TS 25.304 and TS 25.331.

Although the apparatus is adapted to use a candidate set of cells in which at least one cell is not a cell supporting the existing connected mode state, it may be the case that there is no cell meeting the at least one predetermined criterion. There may be occasions when the serving cell or active set provides an adequate candidate set. However, by being capable of using a candidate set of cells which goes beyond the existing serving cell or one or more cells of the active set, the apparatus can provide significant improvements in cell selection in several situations.

In a first example, the transition of the equipment from an existing connected mode state could have been in response to a UTRAN message indicating a UTRAN preferred cell. In the prior art, if the UTRAN preferred cell is not amongst the one or more cells supporting the existing connected mode state (that is, the UTRAN preferred cell is not the existing serving cell or in the existing active set), then it will not be selected. However, the UTRAN is likely to have significant reasons for preferring a cell, such as congestion avoidance in other cells or to reduce the need for cell updates by the UE by choosing a large cell. If the UTRAN preferred cell is not selected, the UE is immediately forced to perform a cell update procedure, for example as specified in Section 8.2.2.3 of TS 25.331.

Thus the at least one predetermined criterion might be that said at least one cell comprises a cell identified to the mobile communications equipment by the network. Such a cell could be a UTRAN preferred cell or a cell of a virtual active set.

(A virtual active set is a set which has been enhanced by the UTRAN to include inter-frequency cells as well as intra-frequency cells.)

In a second example, the existing serving cell or active set may have a strong but neighbouring cell. If this is the case, a cell update procedure is likely to be run as soon as permitted as the UE becomes aware of the strong neighbouring cell.

Thus it may be preferred that in the cell selection apparatus described above, said at least one further cell comprises a cell neighbouring the serving cell or a cell of the active set. In this case, the at least one predetermined criterion might be that said at least one cell has a strong power measurement associated with it. This might be a stored power measurement or for instance one taken at the time of the transition.

In an alternative arrangement, said at least one further cell may comprise a cell identified by historic cell-related information arising from past behaviour of the communications equipment, such information being stored by or in relation to the mobile communications equipment. For example, the information might indicate that a cell had often or recently been selected, visited or measured by the equipment in the past. In this case, the at least one predetermined criterion might be a measure of that behaviour, such as number of times or period of time.

It is known to use power measurements in cell selection. However, this is not the only possible factor in selecting cells. Various selection criteria could be used, being based on at least one parameter for each of the candidate set of cells. However, it may be preferred to give preference to a type of cell, for instance a cell in the candidate list which is a network-preferred cell. To implement this, the mobile communications equipment might further comprise parameter adjustment means for preferentially adjusting at least one parameter for at least one of the candidate set of cells, thereby changing the probability that said at least one cell will be selected.

According to a second aspect of embodiments of the present invention, there is provided a method of selecting a cell of a cellular network to support subsequent communications between the network and mobile communications equipment on transition of the equipment out of an existing connected mode state in which communication is supported by a serving cell or an active set of one or more cells, which method comprises the steps of:

i) assembling a candidate list of cells; and
ii) selecting a cell from the candidate list, wherein step i) comprises identifying for said candidate list at least one cell which is not a cell supporting the existing connected mode state, said at least one cell meeting one or more predetermined criteria.

The one or more predetermined criteria might be as described above in relation to the first aspect of the invention.

Further inventive features of embodiments of the invention are as set out in the claims hereto.

It should be noted that any feature described in relation to one aspect of the invention may be applied in relation to one or more other aspects of the invention if appropriate. Features may indeed be applied in any combination without departing from an embodiment of the invention.

Cell selection apparatus and methods according to embodiments of the present invention will now be described, by way of example only, with reference to the following figures in which.

Figure 1:
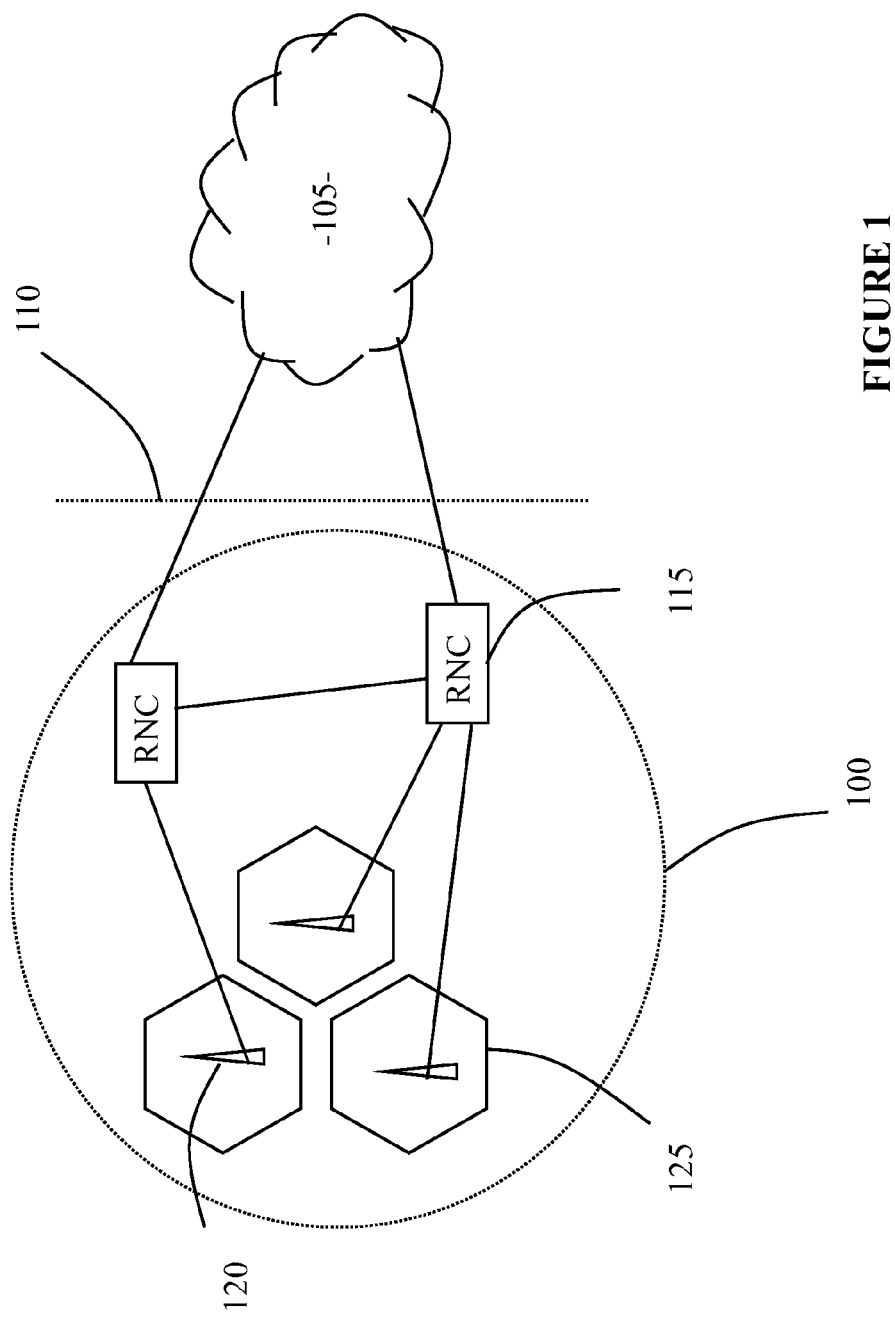
FIG. 1 shows a schematic block diagram of a UMTS cellular network in which the cell selection apparatus and methods might be applied.

Referring to FIG. 1 and as described above, a UMTS cellular network usually has two primary parts, the UTRAN ("UMTS Terrestrial Radio Access Network") 100 and the core network 105. The UTRAN 100 looks after the physical aspects of providing wireless access for a mobile UE (not shown in FIG. 1) to the core network 105 and the core network provides switching. The UTRAN and the core network communicate with each other via an interface known as the "Iu" 110.

The UTRAN 100 is made up of a set of RNSs ("Radio Network Subsystems"). Each RNS comprises one RNC ("Radio Network Controller") 115 and one or more logical nodes known as "Node Bs" 120. The RNC 115 provides functionality similar to the base station controller in GSM networks and each Node B 120 is the access point of a cell 125, equivalent to the base station in GSM networks. The RNS, and in particular the RNC 115, provides the following functions:

radio resource control ("RRC")
    admission control
    congestion control
    power control
    handover control In embodiments of the present invention, these functions are of known type and as disclosed in the publications of bodies such as the 3GPP, including the technical specifications referenced above.

The cellular nature of the network is also of known type and may comprise a hierarchical structure of cells 125 including macro cells to provide geographical continuity of service, micro cells for highly populated but low mobility areas and pico cells, usually used for an indoor environment where there are many high capacity but low mobility wireless UEs. Referring to FIG. 2, the UE 200 again is of generally known type and acts as the counterpart of the core network 105, the RNC 115 and the Node B 120 in implementing cellular communications. However, the UE 200 is novel in its cell selection procedures.

Figure 2:
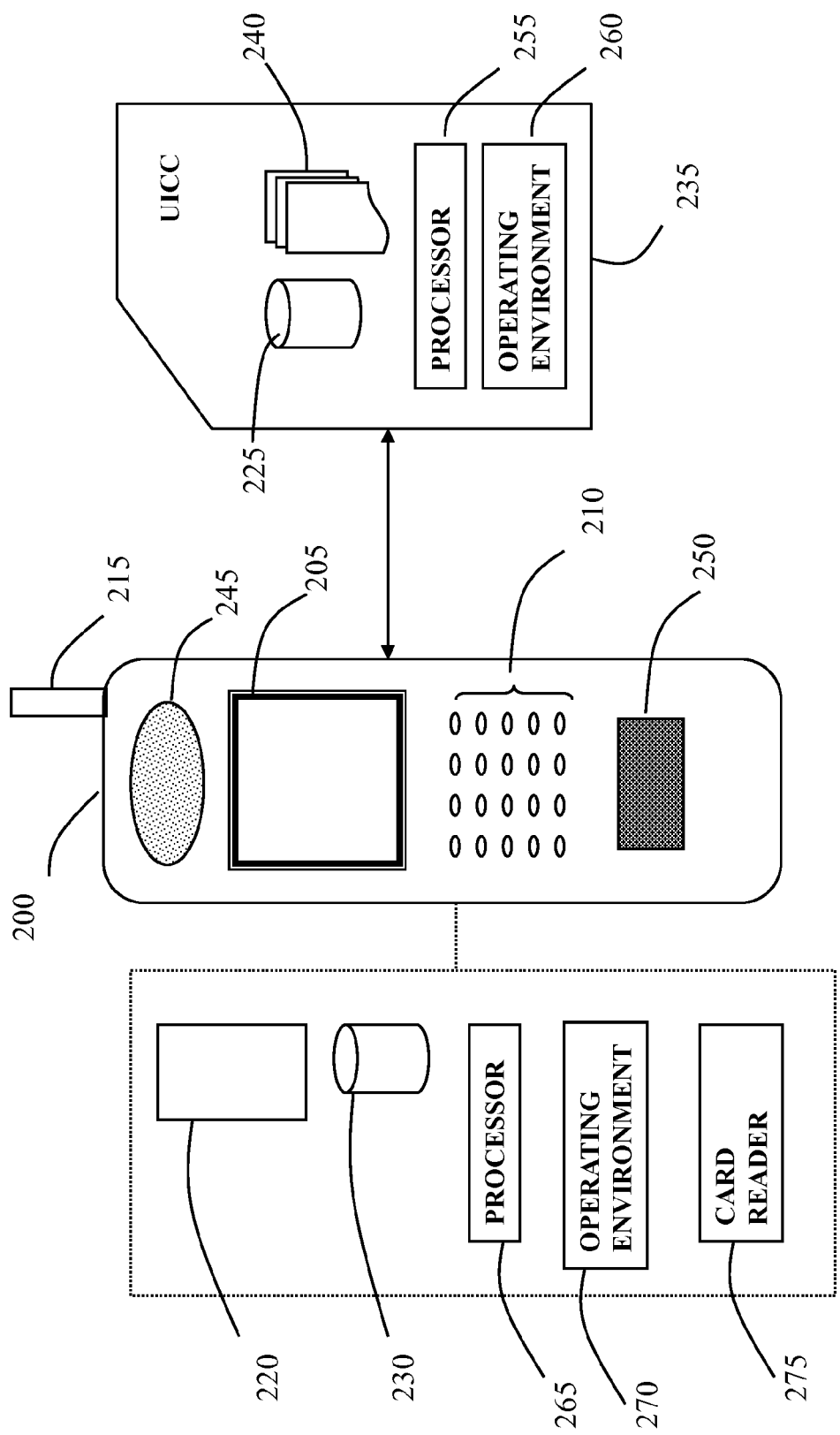
FIG. 2 shows a schematic block diagram of a UE for use with the network of FIG. 1.

The UE 200 as shown in FIG. 2 is a mobile telephone handset. However, many different forms of UE 200 already exist, such as personal digital assistants and laptop computers, and embodiments of the present invention are not limited to any particular form of UE.

The UE 200 generally has a radio antenna 215 for communicating via a Node B 120 across a network in known manner and provides a generally conventional user interface, for example a keypad 210 and display screen 205, a loudspeaker 245 and a microphone 250. The UE also provides a processor 265 and operating environment 270 for running software processes 220 together with some, often limited, data storage capacity 230.

Where the UE 200 is provided as a mobile telephone handset, it is also provided with a smart card reader 275 of known type for interacting with a removable card such as a Universal Integrated Circuit Card ("UICC") 235. The UICC 235 is also provided with a processor 255 and operating environment 260 and carries a data structure 225, and one or more software applications 240. Nowadays, a UICC 235 is effectively a computer, supporting for example user personalisation, secure communications including encryption, and international roaming. However, it is usually the processor 265, operating environment 270 and software processes 220 of the UE 200 itself which run the functions concerned with signalling to and from the cellular network.

The UE 200 interacts with the components of the cellular network in providing functions such as the following:
Node B 120:
Encoding and interleaving
Power control
Radio measurement
Spreading and despreading
Modulation and demodulation
RNC 115:
Acknowledged mode
Radio resource control
Handover and cell selection
Ciphering and deciphering
Core Network 105:
Mobility management
Session management
Bearer negotiation and service requests Embodiments of the present invention are primarily implemented in the software processes 220 for interacting with the RNC 115 and particularly cell selection.

Transitions between idle mode and connected mode states may be triggered for various reasons, such as the UE 200 being switched on and subsequently used to establish a voice or data connection or due to changes in network conditions. The reasons for a transition are not generally important in an embodiment of the invention, only the response of the UE 200 in cell selection.

As discussed above, known procedures of a UE 200 in response to a transition out of a connected mode state, either to idle mode or to another connected mode state, are to perform a cell selection based on a candidate set of cells which is the existing serving cell or active set for the UE 200 prior to transition. In a transition from Cell_DCH, where the candidate set of cells is the existing active set, the UE 200 primarily makes the selection based on power measurements for signals from the Node Bs 120 of the active set of cells. These power measurements can be made and updated by the UE 200 itself.

In embodiments of the present invention, the UE 200 performs a cell selection in response to a transition out of a connected mode state by first applying a selection algorithm to select a candidate set of cells and only then performing cell selection. The step of selecting the candidate set of cells may comprise for example taking the existing serving cell or active set, adding a cell preferred by the UTRAN if not already the existing serving cell or in the existing active set, and/or adding one or more cells neighbouring the existing serving cell or the existing active set, and/or adding one or more cells identified by historic cell-related information such as information arising from previous behaviour of the UE 200.

Cell selection might then be performed in known manner based for example on power measurements. However, in a further innovative step, values associated with a cell in the candidate set may be enhanced or altered prior to cell selection. This enables for example a cell preferred by the UTRAN to have increased likelihood of being selected, although the actual cell selection mechanism is of known type.

If the step of selecting the candidate set of cells is to comprise the possible inclusion of one or more neighbouring cells into the candidate set, the UE 200 needs to have information identifying the relevant neighbouring cells. This can be obtained from system information. System information is broadcast within a cell and provides information about the network configuration. It is broadcast in system information blocks ("SIBs") which group together system information elements of the same nature. Different SIBs may have different characteristics, for example regarding their repetition rate and the requirements of the UE 200 to read the system information. In known arrangements, the information can enable a UE 200 to perform initial cell selection procedures. Typical system information messages will include parameters such as network identification, neighbouring cells, channel availability and power control requirements.

In the following, a set of situations is described in which prior art arrangements give rise to a less than optimum cell selection.

Situation 1

Unless a cell suggested by the UTRAN 100 is the existing serving cell or in the existing active set, or if it is relatively weak, the UE 200 may not select it. There are three consequences of this behaviour. Firstly an immediate cell update will be required, e.g. as specified in TS 25.331 section 8.2.2.3. Secondly, the UE 200 may select a cell that the UTRAN 100 would prefer was not selected, e.g. because that cell is congested. Thirdly there may be a reason why the UTRAN 100 specified a particular cell. For example, it may have specified a large cell to reduce the need for the UE 200 to perform cell updates due to the UE 200 moving.

The UE 200 selecting the cell suggested by the UTRAN 100 benefits the UTRAN 100 with regards to network utilisation and UE distribution and control. Consider the following examples. While in CELL_DCH a monitored set of cells can differ from that in CELL_FACH and idle mode. The network may be using a system of large, low capacity macro "umbrella" cells and high capacity micro cells. In CELL_DCH the UE 200 is connected to one or more micro cells, which form its 'active set'. When the UE moves to CELL_FACH it is likely to select one of these micro cells to camp on, but the UTRAN 100 would prefer that the UE 200 be camped on an umbrella cell.

If the UE 200 is required to try the UTRAN preferred cell first then the UE 200 would camp onto an umbrella cell, and from the updated list of neighbour cells reselect between it and other umbrella cells.

Another example is when several networks are sharing resources. In this case the operator supporting the call would wish the UE 200 to camp onto a cell that offered the most advantage to the operator.

Situation 2

The existing serving cell or active set of cells may exclude a strong cell. If the UE 200 first tries to select a cell from a candidate set of cells that does not include a strong cell close by, there is a danger that a weaker cell will be selected. After one second when a cell reselection is allowed, a stronger neighbour cell of the selected cell may be selected. Had that stronger cell been in the set of candidate cells, the cell reselection would not have been necessary, assuming cell strengths remain constant. Even if cell strengths vary, it is still likely to reduce the number of cell reselections if the strongest cell is selected, all other things being equal.

Situation 3

The UE 200 may not find a suitable cell in its set of candidate cells. In that case, a wider cell search is required. That may take more time and battery energy compared to using a better set of candidate cells.

In more detail, embodiments of the invention will find application as described in the following scenarios. The behaviour of the UE 200 in cell selection in these scenarios can overcome the difficulties mentioned in the "Situations 1 to 3" above. It should be noted that the behaviours of the scenarios described below are not mutually exclusive and there may be advantage in applying more than one of them in a cell selection procedure.

Scenario 1: Adding a UTRAN Supplied Cell to a Candidate Set

By adding the cell specified by the UTRAN to the list of cells from which a selection can be made, it is now possible for the UE to select that cell.

Scenario 2: Adding Strong Measured Cells to a Candidate Set

By adding strong cells already known to the UE 200 into the candidate set of cells, it reduces the chance of no cells being found, and it reduces the chance that a weaker cell will be selected, only to reselect a stronger cell one second later. In particular, if the UE 200 is leaving Cell_DCH because of a radio link failure, then this may be because all of the cells in the active set have become too weak to be suitable (although it is also possible for example that the dedicated channel(s) has been switched off and that the cells in the active set are still viable).

Scenario 3: Preferring a UTRAN Supplied Cell in a Candidate Set

In this scenario, preference might be given to the UTRAN supplied cell, if there is one. This might be done by ignoring the strength of other cells and selecting the UTRAN supplied cell as long as it meets certain criteria. These criteria may be simply those for a cell to be a suitable cell (for instance as defined in UTRAN relevant standards material). Alternatively, an advantage can be given to the UTRAN supplied cell but that cell is still compared against other cells. For example, Squal (the cell selection quality value referred to in TS 25.304) or Srxlev (the cell selection RX level value referred to in TS 25.304) or both could be adjusted for the UTRAN supplied cell, and then these values could be compared with values for other candidate cells. This solution has the advantage that the UTRAN supplied cell is more likely to be selected, and so allows the benefits of that behaviour to be realised.

Scenario 4: Adding One or More Neighbour Cells to a Candidate Set

In this scenario, the set of candidate cells is augmented with cells that are specified to be neighbours of those cells. For example, in the case of leaving Cell_DCH, if the active set contained the cells A and B, and cell A had neighbours B and C, and cell B had neighbours A and D, then the UE 200 could augment the set {A, B} to be {A, B, C, D}. Consider the case where D is stronger than B, and B is stronger than A and C. If the UE 200 had not applied this solution, it would have selected cell B, only to perform a cell reselection as soon as it could (one second later) to the stronger cell D. The solution ensures that D is selected initially, and so no cell reselection is required.

This solution could be applied iteratively. For example, in the above example if Cell E was a stronger neighbour of cell D, then cell reselection of cell E would occur. However, if the neighbours of the neighbours of the active set were also added to the set of candidate cells, then cell E would be selected in the first place. It is likely however that for each iteration of adding in the neighbour cells, there is less chance of finding a stronger cell. A single iteration of this technique is likely to be found optimal or near optimal.

An enhancement of the technique is as follows. Start with a candidate set X, add to X the neighbour cells of cells in X, and call this new set Y. If the strongest cell in Y is in X, then none of its neighbours are stronger. But if the strongest cell in Y is cell $c(1)$, which is not in X, then iterate the following process for i=1, 2, 3, etc. until the exit condition is satisfied. Measure the neighbour cells of cell $c(i)$. If no neighbours of cell $c(i)$ are stronger than cell $c(i)$, then select cell $c(i)$ as the cell on which to camp. Otherwise, pick the strongest neighbour of cell $c(i)$, and call this $c(i+1)$, and repeat the process. Because cells have a finite set of values for strength, and $c(i+1)$ is always stronger than $c(i)$, this process must terminate. It may be desirable to terminate this process after a fixed number of iterations however, to speed up the procedure at the expense of possibly picking a cell with a stronger neighbour.

In order to apply the behaviours of this scenario, information about neighbour cells is required. If the UE 200 is moving from Cell_DCH to another connected mode (Cell_PCH, URA_PCH, or Cell_FACH) then SIB types 11 and 12 define the neighbour cells for cell reselection. If the UE 200 is moving from Cell_PCH, URA_PCH, or Cell_FACH to Idle mode then SIB type 11 defines the neighbour cells for cell reselection. The UE 200 could store these SIBs whenever it reads them. Even if they expire because six hours elapse since they were read, they could still be used for this purpose. Cell neighbour lists may not change much over time, and so using an old list may well be much better than not taking neighbours into account. As the UE 200 is likely to have limited memory for storing such data, choices will need to be made about which cells information to overwrite.

If the UE does not have a stored neighbour list that could be used by this technique, then it could either use an empty list, or it could read the relevant SIB (SIB11 or SIB12) from the relevant cell. If the UE 200 has identified that a cell c(i) is potentially the cell on which it will camp, then it has to read some SIBs to ensure it is a suitable cell. It may be that while waiting for those SIBs, the relevant neighbouring cell SIB (i.e. SIB11 or SIB12) is scheduled. In that case it may be worth measuring any unmeasured cells to check if there is a stronger neighbour. However, if the UE 200 does not have neighbour information for several cells in the original set of candidate cells, it probably isn't worth reading those SIBs before taking measurements. Besides, if c(1) is the strongest cell, the neighbours of other cells in the original set are not relevant.

Scenario 5: Miscellaneous Additions to Set of Candidate Cells

To increase the chance of the measurements on a candidate set of cells resulting in detection of a suitable cell, various classes of cells could be added to that set. The time taken to perform the measurements is likely to increase with the size of the set, and there is a compromise between taking slightly longer and increasing the chances of success, which may save time because larger searches are not required.

Examples of classes of cells that could be added to the set of candidate cells are cells based on historic behaviour of the UE, as follows:
1. recently measured cells;
2. frequently measured cells;
3. recently visited cells;
4. frequently visited cells;
5. recently selected cells;
6. frequently selected cells; and
7. any cell which has been detected for a long period, particularly if the UE has been moving about.

A cell in category "7." is likely to be a large or reliable cell.

It may be the case that there is no UTRAN preferred cell but the UE 200 may still be able to identify a suitable candidate cell from SIBs of that cell. For example, a cell may be an umbrella cell as described above, having low bandwidth but large geographical area. Such a cell might be suitable for the UE 200 in its post-transition connected mode state or idle mode even if it was not suitable in the pre-transition state.

An example of another class of cell that could be added to the set of candidate cells are cells in a virtual active set.

The above scenarios can be generally described as cell selection procedures in apparatus for selecting a cell as a serving cell for user equipment within a wireless network when the equipment is transitioning from a connected mode state in which communication is provided by a pre-transition serving cell or active set. The apparatus for putting the procedures into effect will comprise cell selection apparatus, for instance supporting a channel configuration mechanism, and listing means for configuring a list of candidate cells for selection by the selection apparatus, wherein the listing means is adapted to configure a list that comprises at least one cell selected from the following:
i) one or more cells neighbouring the pre-transition serving cell or neighbouring one or more cells of the pre-transition active set;
ii) a cell specified by the network;
iii) one or more cells identified by stored information of the equipment; and
iv) a cell identified by system information received by the mobile communications equipment.

The cell selection apparatus may select a cell on the basis of whether cells in the candidate list meet at least one predetermined criterion. For example, said at least one predetermined criterion might be for instance a relative power measurement and/or simply that said at least one cell is a cell specified by the network. Power measurements for the cells in the candidate list might for example be obtained in real time, by power measurement apparatus of known type, or from stored data.

A cell specified by the network might for instance be specified as a UTRAN preferred cell at the time of making the transition or might be a cell of a virtual active set.

The channel configuration mechanism may then comprise a cell selection mechanism for selecting a cell from a candidate list as described above, attempting to tune to the broadcast control channel of the selected cell, establishing said tuning if the attempt is successful, or if not successful, repeating the process continuing with a different cell from the configured list of candidate cells. The different cell may suitably be the one that has the greatest measured power.

Such a cell selection procedure, and the apparatus for putting it into effect, allows a broader group of cells from which to select than the prior art, thereby enabling mobile user equipment to pick a good cell from the start, avoiding inefficient use of radio resources and power.

Figure 3:
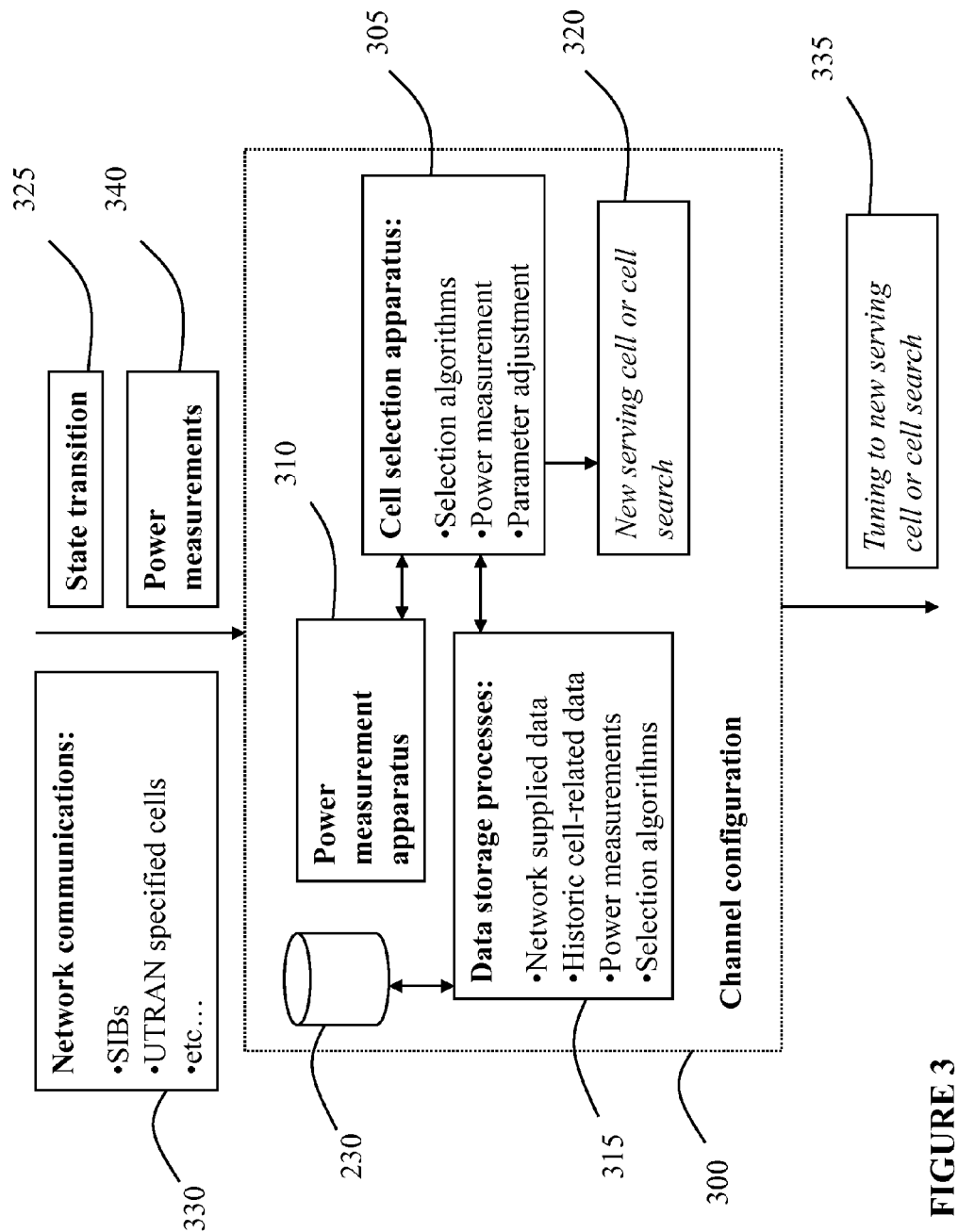
FIG. 3 shows a functional block diagram of components of the UE of FIG. 2 with particular relevance to cell selection.

Referring to FIG. 3, the components present in a UE 200 to enable an embodiment of the present invention may generally be provided in association with channel configuration apparatus 300 installed amongst the software processes 220 shown in FIG. 2. The channel configuration apparatus 300 has access to the data storage capacity 230 of the UE 200 and it receives three general types of input 325, 330, 340 these being state transitions 325 originated by the UE 200, network communications 330 and power measurements 340. These inputs can be used as appropriate by cell selection apparatus 305, in the event of a transition from a connected mode state to another connected mode state or idle mode, to select and output a new serving cell 320. The channel configuration apparatus 300 will then tune to an appropriate channel of the new serving cell, such as the broadcasting control channel, for receiving subsequent communications at the UE 200 from the network. In the event a new serving cell cannot be selected, it may alternatively be necessary to instigate a cell search.

The network communications 330 might comprise SIBs which as described earlier can for instance be used to obtain lists of neighbouring cells. This network-supplied data can be stored by the data storage processes 315. However, there are other network communications which are relevant to the cell selection apparatus 305, these being for example:
1. Reconfiguration messages (which may contain a UTRAN-specified cell)
2. Cell Update Confirm messages (which may contain a UTRAN-specified cell)
3. RRC Connection Release messages (which force the UE to idle mode)

In order to provide appropriate tuning, the channel configuration apparatus 300 has the following components:
cell selection apparatus 305 for applying selection algorithms and including a parameter adjustment mechanism for favouring selection of for example a UTRAN preferred cell
power measurement equipment 310 for measuring the power of radio cells (in known manner)
data storage 230 and processes 315 for storing network-supplied data, historic cell-related information arising from past behaviour of the UE 200, cell power measurements and selection algorithms In a process provided by the channel configuration apparatus 300, the following steps may be taken in response to an input indicating a connected mode state transition:

STEP 1: an overall cell selection process 305 starts to run. This must assemble a candidate set of cells for making a selection. It does this according to a selection algorithm by doing one or more of the following:

i) listing an existing active set or serving cell of one or more cells for the UE 200 prior to transition, ii) adding any UTRAN preferred cell or cell in a virtual active set which may have been notified in an incoming network communication 330, iii) referring to stored SIB data to identify cells neighbouring the cells of the existing active set or serving cell, iv) referring to stored cell power measurements, and v) referring to stored (historic) cell-related information arising from past behaviour of the UE 200 to identify cells from the list 1. to 6. under "Scenario 5" above.

The strategy for assembling a candidate list of cells from the categories above in any particular circumstance can be set in the UE 200, for example as an updatable stored selection algorithm. Such an algorithm may be relatively simple, such as adding cells from the categories i) to v) above in sequence until the candidate list has reached a threshold number of cells in it. Alternatively, an algorithm could set a threshold in relation to each category, such as using a cell from category iv) only if the stored power measurements indicate the cell had a power significantly greater, say 150%, of the power of any cell in the existing active set or of the existing serving cell.

STEP 2: having assembled a candidate list, the cell selection process 305 obtains power measurements in respect of the cells, the measurements being obtained in known manner by the power measurement equipment 310 and/or by reference to stored data.

STEP 3: the cell selection process 305 uses its parameter adjustment capability to adjust a value for at least one parameter for one or more cells in the candidate list, thus changing its chances of selection. This is likely to be done in particular so as to enhance the chances of any UTRAN preferred cell to be selected. However it could also be done for example to decrease the value of stored power measurements in relation to measurements obtained in real time. Parameter adjustment data, such as rules for carrying it out, could be pre-programmed in the cell selection apparatus 305 or could be delivered to it in network communications such as SIBs.

STEP 4: the cell selection process 305 now selects from the cells in its candidate list to identify a new serving cell in an output 335 for use in channel configuration between the UE 200 and the network. This can be based on one or more parameters for the cells but might simply be based on the power measurements, after adjustment. In the event a new serving cell cannot be selected, it may alternatively be necessary to instigate a cell search.

Although called a process, the cell selection process 305 can equally be viewed as a "candidate set assembler": apparatus which in use generates an output, a selected serving cell, which subsequently controls behaviour of the UE 200 in configuring its communications.

It might be noted that the word "comprising" as used in this specification is intended to be broadly interpreted so as to include for instance at least the meaning of either of the following phrases: "consisting solely of" and "including amongst other things".

The invention claimed is:

1. A mobile device for use in a wireless network, the device comprising cell selection apparatus for use to select a cell from a candidate set of cells to support subsequent communication between a wireless network and the device, said cell selection apparatus being triggerable, by a transition of the device out of an existing connected mode state in which communication is supported by a serving cell or an active set of one or more cells, to select said cell, wherein the mobile device comprises a data store for storing cell power measurement data;

wherein the cell selection apparatus is adapted to use as said candidate set a set of cells comprising at least one cell which is not a cell supporting the existing connected mode state and wherein the cell selection apparatus further comprises parameter adjustment means arrange to adjust at least one parameter for at least one cell of the candidate set of cells, thereby changing a probability that said at least one cell will be selected, the parameter adjustment being performed at the mobile device, wherein said parameter adjustment means is arranged to adjust a stored value of a previously measured power measurement for the at least one cell.

2. The mobile device according to claim 1 wherein said at least one cell comprises a cell identified to the mobile device by the network.

3. The mobile device according to claim 1 wherein said at least one cell comprises a cell neighboring a cell supporting the existing connected mode state.

4. The mobile device according to claim 1 wherein said at least one cell comprises a cell identified by information stored by the mobile device.

5. The mobile device according to claim 4 wherein said information stored comprises historic cell-related information arising from past behaviour of the mobile device.

6. The mobile device according to claim 4 wherein said information stored concerns power measurement data in relation to said at least one cell.

7. The mobile device according to claim 1 comprised by channel configuration apparatus in the mobile device for configuring a communication channel in the network.

8. The mobile device according to claim 1 wherein said parameter adjustment means is adapted to select a cell identified to the mobile device by the network for said adjustment.

9. The mobile device according to claim 1, further comprising power measurement equipment for taking power measurements with respect to cells of the candidate set of cells, wherein the selection of a cell is based at least in part on said power measurements.

10. The mobile device according to claim 1, further comprising an algorithm store for storing at least one selection algorithm for use in assembling a candidate set of cells.

11. The mobile device according to claim 1, further comprising a data store for storing system information for use in identifying one or more cells neighbouring a cell supporting the existing connected mode state.

12. The mobile device according to claim 1, further comprising a data store for storing data relevant to historic cell-related information arising from past behaviour of the mobile device.

13. The mobile device according to claim 1, wherein the network comprises a UMTS-based network.

14. The mobile device according to claim 1 wherein said transition of the device comprises a transition from a state in which it has a dedicated channel to a state in which it is camped on a cell.

15. The mobile device according to claim 13 wherein said existing connected mode state comprises any one of Cell_DCH, Cell_FACH, Cell_PCH, and URA_PCH.

16. The mobile device according to claim 1 wherein said transition of the device out of an existing connected mode state comprises a transition to an idle mode.

17. The mobile device according to claim 13 wherein said transition of the device out of an existing connected mode state comprises one of the following transitions:
 a) Cell_DCH to Cell_FACH, Cell_PCH, or URA_PCH;
 b) Cell_FACH to Cell_FACH, Cell_PCH, or URA_PCH; and
 c) Cell_FACH or Cell_DCH to an idle mode.

18. A method of a mobile device selecting a cell of a network to support subsequent communications between the network and the mobile device on transition of the mobile device out of an existing connected mode state in which communication is supported by a serving cell or an active set of one or more cells, which method comprises the mobile device:
 i) assembling a candidate list of cells; and
 ii) selecting a cell from the candidate list,
 wherein operation i) comprises the mobile device identifying for said candidate list at least one cell which is not a cell supporting the existing connected mode state, said at least one cell meeting one or more predetermined criteria; and
 further comprising the mobile device adjusting a value for at least one parameter of a cell in the candidate list, prior to operation ii), so as to change the likelihood of selection of said cell, the parameter being performed by the mobile device, wherein said at least one parameter comprises a stored value of a previously measured power measurement for the cell.

19. A method according to claim 18 which further comprises the operation of receiving an input identifying a transition from the existing connected mode state of the mobile device.

20. A method according to claim 18 which further comprises the operation of receiving data identifying a network-preferred cell, and wherein the at least one cell comprises said network-preferred cell.

21. A method according to claim 18 wherein said operation of adjusting a value comprises adjusting a value for at least one parameter of the network-preferred cell.

22. A method according to claim 18, further comprising the operation of storing system information for use in identifying said at least one cell.

23. A method according to claim 18 which further comprises the operation of storing historic cell-related information arising from past behaviour of the mobile device, for use in identifying said at least one cell.

24. A method according to claim 18 which further comprises the operation of storing cell power measurement data, for use in identifying said at least one cell.

25. A method according to claim 18 wherein operation ii) is carried out by reference to power measurements for the cells of the candidate list.

\* \* \* \* \*